United States Patent [19]

Inoue et al.

[11] Patent Number: 5,384,196
[45] Date of Patent: Jan. 24, 1995

[54] POLYARYLENE SULFIDE COMPOSITE MATERIALS AND PREPARATION THEREOF

[75] Inventors: Hiroshi Inoue; Tamotsu Ise, both of Yokkaichi, Japan

[73] Assignee: Tosoh Corporation, Yamaguchi, Japan

[21] Appl. No.: 955,268

[22] Filed: Oct. 1, 1992

[30] Foreign Application Priority Data

Oct. 1, 1991 [JP] Japan .................. 3-278968
Sep. 4, 1992 [JP] Japan .................. 4-260567

[51] Int. Cl.$^6$ .............................. B32B 9/04
[52] U.S. Cl. ................. 428/411.1; 428/297; 528/373; 524/264; 524/265; 524/609
[58] Field of Search .............. 428/297, 411.1; 524/264, 265, 609; 528/373

[56] References Cited

U.S. PATENT DOCUMENTS

| | | | |
|---|---|---|---|
| 4,202,951 | 5/1980 | Wang et al. | 525/416 |
| 4,233,366 | 11/1980 | Sample, Jr. et al. | 428/405 |
| 4,389,453 | 6/1983 | Kitanaka et al. | 428/297 |
| 4,703,074 | 10/1987 | Izutsu et al. | 524/609 |
| 4,739,007 | 4/1988 | Okada et al. | 524/789 |
| 4,810,734 | 3/1989 | Kawasumi et al. | 523/216 |
| 5,026,764 | 6/1991 | Okabe et al. | 524/540 |
| 5,045,367 | 9/1991 | Bobsein et al. | 428/297 |
| 5,049,446 | 9/1991 | Blackwell et al. | 428/297 |
| 5,071,905 | 12/1991 | Köhler et al. | 524/494 |
| 5,079,079 | 1/1992 | Stone et al. | 428/297 |
| 5,085,930 | 2/1992 | Widmann et al. | 428/323 |
| 5,110,681 | 5/1992 | Satake et al. | 428/297 |
| 5,200,271 | 4/1993 | Kosaka | 428/472.2 |
| 5,231,207 | 7/1993 | Yanagisawa et al. | 556/424 |
| 5,258,442 | 11/1993 | Kato et al. | 524/609 |

FOREIGN PATENT DOCUMENTS

| | | |
|---|---|---|
| 62-045654 | 2/1987 | Japan . |
| 62-074957 | 4/1987 | Japan . |
| 62-230848 | 10/1987 | Japan . |
| 62-230849 | 10/1987 | Japan . |
| 62-230850 | 10/1987 | Japan . |
| 1225660 | 9/1989 | Japan . |

*Primary Examiner*—John Kight, III
*Assistant Examiner*—P. Hampton-Hightower
*Attorney, Agent, or Firm*—Sughrue, Mion, Zinn, Macpeak & Seas

[57] ABSTRACT

An improved polyarylene sulfide composite material in which particles of layer-structure silicate mineral modified by introduction of organic moieties are dispersed in and ionically or covalently bound to polyarylene sulfide matrix, as well as preparation of said composite material is disclosed.

24 Claims, 2 Drawing Sheets

POLYARYLENE SULFIDE COMPOSITE MATERIALS AND PREPARATION THEREOF

BACKGROUND OF THE INVENTION

This invention relates to a polyarylene sulfide composite material and a process for preparing the composite material. In particular, the invention relates to such a composite material in which a layer-structure silicate mineral material is dispersed in a polyarylene sulfide matrix, said dispersed mineral material being linked to side matrix either by covalent or ionic bonding and relates to a process for preparing the composite material.

Polyarylene sulfides (PAS), typically polyphenylene sulfide (PPS), have been employed in a wide range of applications, for example in production of electronic and electric parts, automobile parts and the like, because of their excellent heat resistance, chemical resistance and fire retardency properties.

However, the PAS materials, in particular PPS that is a crystalline resin, generally have a relatively high glass transition temperature on the order of 90° C. and exhibit a relatively low crystallizing rate. Therefore, where the PAS materials are injection molded to produce moldings, the mold temperature should be set in the range of about 130°–150° C. in order to obtain acceptable products of good heat resistance and dimensional stability properties. Employment of such a high mold temperature has made the PAS materials very disadvantageous where they are used in molding processes, as compared with other engineering plastics, e.g. nylons and PBT, which may be molded with a mold temperature less than 100° C. This is considered to have been a factor arresting expansion of the application of PPS materials.

Further, the PAS materials themselves are brittle and relatively less resistant to heat. Therefore, before use, the materials should incorporate with a reinforcing filler, such as glass fibers or carbon fibers, or inorganic fillers, such as calcium carbonate, mica talc, clay or the like.

However, where the conventional reinforcing fillers are used in a small proportion, the resulting reinforcing effect is not appreciable. Thus, in order to achieve an acceptable reinforcing effect as well as improved thermal resistance and rigidity properties, usually the reinforcing fillers have been required to be used in a proportion as high as about 30–50% by weight. When an inorganic filler, e.g. a clay mineral, is simply added to the PAS materials in accordance with the prior art techniques, the individual silicate layers composing the layer-structure silicate mineral (clay mineral) which strongly interact and adhere to each other could not be brought into a evenly dispersed state in the PAS matrix, but rather would be present as laminates each comprising a large number of silicate layer adhering strongly to each other. Such a difficulty in dispersing the inorganic filler evenly in the resin matrix and hence a correspondingly low reinforcing effect in accordance with the prior art techniques would have necessitated employment of the inorganic fillers in the above-mentioned large proportion. Therefore, the PAS composite materials produced by the conventional techniques have an increased specific gravity that is undesirable for production of lightweight articles or parts. Further, the conventional PAS composite materials loaded with such an increased proportion of inorganic fillers tend to produce moldings having a surface of poor smoothness.

Further, the PAS composite materials achieved by the prior art techniques have another drawback that they show a decreased specific volume resistance under high humidity and temperature conditions, possibly due to a poor affinity between the PAS matrix and the added reinforcing and/or inorganic filler.

When the conventional composite materials loaded with a high proportion of reinforcing filler and/or inorganic filler are used for encapsulating or coating IC devices having very fine bonding wires, there is a risk that the fine wires are accidentally broken or heavily deformed by the solid filler and hence any functional trouble of the IC devices is caused to occur.

In order to solve a relatively low crystallizing rate, various techniques or ideas have been proposed, for example, addition of an oligomeric polyester having a molecular weight of at most 6000 to a PPS of a melt viscosity of at least 5 Pa.s (Japanese Patent Public Disclosure, KOKAI No. 62-45654); addition of a monomeric carboxylate ester (Japanese Patent Public Disclosure, KOKAI No. 62-230848); addition of organic thioethers (Japanese Patent Public Disclosure, KOKAI No. 62-230849); addition of a specific class of aromatic phosphate esters (Japanese Patent Public Disclosure, KOKAI Nos. 62-230850 and, 01-225660). However, these known approaches are effective to promote crystallization of the PAS materials to only a slight extent, but have failed to sufficiently enhance the crystallization to a practically acceptable extent. Since the crystallization-promoting additives proposed in the prior art references are generally of poor thermal resisting properties and tend to volatile or decompose with generating gases during the molding process. Further, since the crystallization-promoting additives are of low molecular weights, the additives tend to migrate to the surface region of product moldings, resulting a smearing problem.

On the other hand, Japanese Patent Public Disclosure, KOKAI No. 62-74957 discloses a composite material of polyamide/layer-structure silicate mineral in which the layer of silicate mineral are evenly distributed in the polyamide resin. In this reference, typically, the layer-structure silicate mineral is organized with an organic onium salt containing carboxyl groups, and the thus resulting organomodified mineral is combined with the polyamide material to give an composite material. However, even though the typical organomodified silicate mineral that was taught in the above-cited reference 62-74957 was combined with a PAS to prepare a PAS-based composite, this composite did not show improved heat resistance and rigidity properties as achieved by the known polyamide/silicate mineral composite materials, since the molecular structure of PAS did exert only a weak affinity for the known modified mineral.

The present invention provides a PAS composite material solving the problems and difficulties experienced with the prior art techniques and which exhibits an increased crystallizing rate and is improved particularly in the heat resistance and rigidity properties. Also, the invention provides a process for preparing such an improved PAS composite material.

SUMMARY OF THE INVENTION

In accordance with one aspect of the invention, a PAS composite material comprises a PAS and an organomodified layer-structure silicate mineral, wherein the PAS and the silicate mineral are linked together either by covalent or ionic bonding. The PAS composite material may comprise about 0.1–150 parts by weight of the organomodified layer-structure silicate mineral per 100 parts by weight of the PAS.

According to another aspect of the invention, there is provided a PAS composite material which comprises a PAS matrix material and silicate layers resulting from a layer-structure silicate mineral and dispersed evenly through said matrix with a mean distance of at least 30 Angstroms between the individual layers, said PAS and silicate layers being linked together either by ionic or covalent bonding. The expression "dispersed evenly" as used herein means that the layers of silicate mineral are separated discretely into individual single layers or laminates containing a few layers with a mean distance of at least 30 Angstroms between the centers of gravity of the individuals and that at least 50%, preferably at least 70%, of the silicate material is dispersed without forming masses consisting of large number of silicate layers.

The PAS materials used in the invention include polymers in which aromatic residues combined to each other via a thioether linkage, in particular polymers comprising predominantly of at least one of repeating units (I)–(VI):

wherein Y is —R, —OR, —OM, —COOR, —COOM, —NR$_2$, —CONR$_2$ or —CN, where R represents hydrogen, a C$_1$–C$_{24}$ alkyl group, or a C$_6$–C$_{24}$ cycloalkyl, aryl or aralkyl group and M represents an alkali metal; X is —CO—, —CONR$^1$—, —SO—, —SO—, —CR$^2$R$^3$—or —SiR$^2$R$^3$—, where R$^1$, R$^2$ and R$^3$ each represent hydrogen, a C$_1$–C$_{24}$ alkyl group or a C$_6$–C$_{24}$ cycloalkyl, aryl or aralkyl group; a is an integer of 0–4; b is an integer of 0–2; c is an integer of 0–4; d is an integer of 0–3; e is an integer of 0–3; f is an integer of 0–3; g is an integer of 0–5; h is an integer of 0–4; i is an integer of 0–4; j is an integer of 0–4; k is an integer of 0–4; and n is an integer of 1–3.

The PAS materials used in the invention may be a polymer comprising one of-repeating units (I)–(VI) or a polymer comprising two or more of repeating units (I)–(VI). In the latter case, the polymer may be either a random or block copolymer. The PAS material may be of a linear structure or of a branched and/or cross-linked structure which may result from using a polyhaloaromatic compound containing three or more halogen atoms as a comonomer in the PAS synthesis stage or may result from thermal curing of the PAS material in air. As some examples of such the PAS materials, may be mentioned, poly(p-phenylene sulfide) as disclosed in Japanese Patent Publications, KOKO-KUs, Nos. 45-3368 and 52-12240; polyphenylene sulfide ketone as disclosed in Indian Journal of Chemistry, 21, 501 (1982); polyphenylene sulfide sulfone as disclosed in Japanese Patent publication, KOKOKU, No. 53-25880; polybiphenylene sulfide as described in Japanese patent Publication, KOKOKU, No. 45-3368; polyphenylene sulfide amide as described in Japanese Patent Public Disclosure, KOKAI, No. 63-83135; and polycyanophenylene sulfide as described in Japanese Patent Public Disclosure, KOKAI, No. 1-263118.

In the invention, PAS materials having a weight average molecular weight in the range of about 10,000 to about 500,000 are conveniently employed. The term "weight average molecular weight" used herein refers to the value determined using a gel permeation chromatography (GPC) apparatus. For example, the weight average molecular weight of poly(p-phenylene sulfide) may be determined at a temperature of 210° C. using 1-chloronaphthalene as solvent.

The PAS materials which may be suitably used in the invention are those carrying functional groups reactive with the organomodified layer-structure silicate minerals. Examples of the reactive groups include amino, carboxyl, acid anhydride, hydroxyl and thiol groups and the like.

The silicate layer or layers from the layer-structure silicate minerals used in the invention are of layer-structure phyllosilicate consisting either of magnesium silicate layer or aluminium silicate layer having a thickness of about 6-15 Angstroms. In these silicate layers, there is isomorphous replacement occurred between some of the Mg or Al atoms and lower-valent atoms such as Li or Mg. Due to the isomorphous replacement, the silicate layers may be negatively charged. Preferably, the degree of the negative charging is such that a unity valency of the negative charge occupies a surface area of about 25 to about 200 square Angstroms of the silicate layer. These anion sites may be ionically bound to an organic onium salt and then an appropriate functional group in said organic onium salt is reacted or interacted with the PAS so as to complete linkage between the silicate layer and PAS.

The silicate layers carry silanol groups on their surfaces. The quantity of the surface silanol groups is preferably from 2 to 4 groups per recurring unit. In the case, the surface silanol groups of the silicate layers may react with a halogenated organosilane or organosilazane to form siloxane linkages, and then the functional groups in the halogenated organosilane residues or in the organosilazane residues will react or interact with the PAS material to complete linkage between the silicate layers and PAS.

The content of the silicate layers in the complete materials of the invention is preferably in the range of about 0.1 to about 150 parts by weight per 100 parts by weight of PAS. If the silicate layer content is not greater than 0.1 part by weight, the quantity of silicate layer is too low to achieve an acceptable level of reinforcement effect and to attain satisfactory improvements in the heat resistance and rigidity properties. On the other hand, if the silicate layer content is greater than 100 parts by weight, then the silicate layers would not be satisfactorily dispersed in PAS as well as the product composite will exhibit an excessively high melt viscosity that results in an unacceptably poor molding processability.

According to a further aspect of the invention, a process for preparing the present composite material comprises at least two steps (A) and (B) as follows: (A) reacting a layer-structure silicate mineral with an organic onium salt, a halogenated organosilane or an organic silazane so as to form an organomodified layer-structure silicate complex, and (B) bringing the thus formed organomodified layer-structure silicate complex into contact with a polyarylene sulfide and allowing them to react so as to provide a polyarylene sulfide composite material.

Although the layer-structure silicate minerals tend to disperse evenly as layers in water, the silicate minerals as such do not disperse evenly in PAS matrix or in organic solvents. However, the layer-structure silicate minerals are made dispersible evenly in organic solvents or PAS through step (A) that is an organization or organomodification treatment for producing an organomodified layer-structure silicate complex.

The organization or organomodification treatment may be effected under various conditions and in various manners. For example, a layer-structure silicate mineral may be modified with organic moieties attached thereto through ionic bonding, where the silicate mineral is dispersed in an aqueous solution of an organic onium salt so as to cause the ion-exchange to take place. In the case where it is intended to modify the layer-structure silicate mineral with organic moieties attached through covalent bonding, the silicate mineral may be swollen in an appropriate polar organic solvent, such as DMSO, DMF, DMA, and then subjected to silylation with an halogenated a organo-silane or an organic silazane.

The layer-structure silicate minerals which may be used in the invention have a cation exchange capacity of about 50-300 meq/100 g and contain 2-4 silanol groups per recurring unit. If the cation exchange capacity is less than 50 meq/100 g and/or the silanol group content is less than 2 per recurring unit, the quantity of the organic groups which are introduced into the layer-structure silicate mineral by ionic or covalent bonding will be too little to achieve a uniform dispersion of layers of silicate mineral in the PAS, resulting a low level of affinity between the PAS and the layers of silicate. On the other hand, if the cation exchange is greater then 300 meq/100 g and/or the silanol group content is exceeds 4 per recurring unit, then the bonding force between the layers of silicate is too strong and will make the layers to be difficulty dispersed.

The layer-structure silicate minerals which may be used in the invention include, for example smectite famility clay minerals, such as montmorillonite, saponite, beidellite, hectorite and stevensite; layer-structure polysilicate salts, such as vermiculite, halloysite, swellable mica, apopyllite, margarite and ganophyllite; crysalline polysilicic acids which may be derived from said polysilicate salts by exchanging the interlayer cations thereof with protons. The layer-structure silicate minerals may be either natural-occurring or artificially synthetic. The silicate mineral may be pulverized, before use, for example by means of mixer, ball-mill, vibration mill, pin-mill, jet mill or bowl grinder.

The onium salts which are used for organizing or organomodifying the layer-structure silicate minerals have the general formula (VII), (VIII) or (IX):

wherein R and R', which may be the same or different, represent each a divalent or higher vatent organic group containing 2-24 carbon atoms, e.g. and alkylene or phenylene group; A is an onium salt, such as an ammonium salt, trialkylammonium salt, pyridinium salt, phosphonium salt; B is a halogen, or a carboxyl, nitro, vinyl, epoxy or thiol group or a derivative thereof; C is a disulfide or azo group; and x is an integer from 1 to 4.

As above-defined, each of R and R' is a divalent or higher valent organic group. The term "organic group" herein used includes not only hydrocarbon groups but also those containing one or more hetero atoms, for example, of amide or sulfon.

As examples of the organic onium salts, may be mentioned, ammonium salts of the following compounds:
3-amino-propionic acid,
4-amino-n-butyric acid,
6-amino-n-caproic acid,
8-aminocaprylic acid,
10-aminodecanoic acid,
12-aminododecanoic acid,
14-aminotetradecanoic acid,
16-aminohexadecanoic acid
18-amino-octadecanoic acid
N,N-dimethyl acrylamide

N,N-dimethyl aminoethyl acrylate,
N,N-dimethyl aminopropyl acrylamide,
1-amino-3-chloropropane,
1-amino-6-chlorohexane,
1-amino-11-chloroundecane,
p-chloroaniline
2-amino-5-chlorobenzophenone,
3,5-dichloropyridine,
p-aminothiophenol,
4,4'-diamino diphenyl disulfide,
2,2'-azobis(2-methyl-N-phenyl propion amidine),
2,2'-azobis[N-(4-chlorophenyl)-2-methyl propion amidine),
2,2'-azobis[2-methyl-N-(phenyl methyl)propion amidine),
2,2'-azobis(2-amidinopropane),
2,2'-azobis[2-(2-imidazolin-2-yl)propane amide],
2,2'-azobis[2-methyl-N-(2-hydroxyethyl)propin amide],
N-methyl-2-pyrrolidone,
N-methyl-ε-caprolactam,
1,3-dimethyl imidazolidinone.

As examples of the phosphonium salts, allyltriphenyl phosphonium chloride, 3-bromopropyl triphenyl phosphonium bromide, chloromethyl triphenyl phosphonium chloride and the like may be mentioned. The respective organic onium salts may be used, as organizing reagent or organomodifier, singly or in combination of two or more thereof.

The halogenated organosilanes and organosilazanes which may be used for organizing the layer-structure silicate minerals have the following general formula (X) or (XI):

$$Y-R^1-SiR_2^2-X \qquad (X)$$

$$Y-R^1-SiR_2^2-NH-SiR_2^2-Y \qquad (XI)$$

wherein $R^1$ is an organic group containing from 0 to 24 carbon atoms, e.g. an alkylene or phenylene group; $R_2$ is an organic group containing from 1 to 24 carbon atoms, e.g. an alkyl or phenyl group; Y is a halogen, or a carboxyl, nitro, vinyl, epoxy or thiol group or a derivative thereof; and X represents a halogen.

As examples of the halogenated organosilanes, may be mentioned,
3-methacryloxypropyldimethyl chlorosilane,
dimethyl vinyl chlorosilane,
allyl dimethyl chlorosilane,
5-hexenyl dimethyl chlorosilane,
7-octenyl dimethyl chlorosilane,
8-chloro-octyl dimethylchloro silane,
5-carboxyl hexyl dimethyl chlorosilane,
3-glycidoxy propyl dimethyl chlorosilane,
2-(3,4-epoxy cyclohexyl ethyl dimethyl chlorosilane, and the like.

As examples of the organosilazane, 1,3-divinyl-1,1,3,3,-tetramethyl disilazane, 1,3-chloromethyl-1,1,3,3,-tetramethyl disilazane and the like may be mentioned.

The respective halogenated organosilanes and organosilazanes may be used singly or in combination of two or more members as a reagent for organizing or organomodifying the layer-structure silicate minerals.

Step (B) of the present process will be illustrated in detail. In step (B), the organomodified layer-structure silicate mineral from step (A) is reacted with a PAS material. The environment in which the reaction is carried out is not critical. In the case where the composite according the second aspect of the invention is to be prepared, preferably the reaction is carried out in a polar organic solvent in which the PAS is soluble and the organomodified silicate mineral is evenly dispersable so as to eventually achieve an even dispersion of the layers of silicate mineral in the PAS.

As examples of the solvents that may be used for this purpose, may be mentioned,
N,N-dimethyl formamide,
N,N-dimethyl acetamide,
N-methyl-2-pyrrolidone,
ε-caprolactam,
N-methyl-ε-caprolactam,
1,3-dimethyl imidazolidinone
hexamethyl phosphortriamide,
dimethyl sulfoxide,
sulfolanes
diphenyl ether
1-chloronaphthalene and the like.

While the dispersibility of organomodified silicate mineral in the solvent and the solubility of PAS in the solvent are taken into consideration, it is preferred to use an amide solvent, such as
N-methyl-2-pyrrolidone, ε-caprolactam,
N-methyl-ε-caprolactam,
1,3-dimethyl imidozolidinone or the like.

In the case where the organomodification reaction is effected in the absence of solvent, preferably the reaction temperature is above the melting point of the PAS used and the reaction period ranges from about one minute to about 2 hours. Where the reaction is effected in the presence of solvent, the reaction temperature and period conditions are not critical provided that the temperature is sufficient to dissolve PAS in the solvent and to permit the reaction between the functional groups in PAS and the functional groups in the organomodified silicate mineral to proceed in an acceptable period of time. In the latter case, if PPS is employed as PAS, the reaction is preferably conducted at a temperature of about 200°–300° C. for a period of from about 5 minutes to about 24 hours.

After thus the organomodified layer-structure silicate mineral has been reacted with the PAS material in the presence of the solvent, the solvent may be removed by any conventional technique, for example by filtration or by flashing, to give the composite product according to the invention.

The thus prepared composite materials as such may be formed into various moldings, films, sheets, fibers, pipings and the like by injection, extrusion, compression and other molding methods. If desired, the composite materials may be incorporated with reinforcing fillers, for example, glass fibers, carbon fibers, ceramic fibers (e.g. alumina fibers), aramide fibers, wholly aromatic polyester fibers, metallic fiber, potassium titanate whiskers and the like; inorganic fillers, for example, calcium carbonate, mica talc, silica, barium sulfate, calcium sulfate, zeolites, nepheline syenite attapulgite, wollastonite, PMF, ferrites, calcium silicate, calcium carbonate, dolomite, antimony trioxide, zinc oxide, titanium oxide, magnesium oxide, iron oxides, molybdenum disulfide, graphite, gypsum, glass beads, powdered glass, glass balloons, quartz glass, quartz, and the like; and organic and inorganic pigments.

If desired, the composite materials may be incorporated with mold release agents, silane or titanate coupling agents, lubricants, heat stabilizers, weathering agents, nucleating agents, blowing agents, rust-proofing agents, ion-trapping agents, flame-retardants, flame-proofing aids and the like.

Without departing the purpose of the present invention, it is also possible to incorporate the present composite materials with:

thermoplastic elastomers, such as olefinic-, styrene-, urethane-, ester-, fluorine-, amide- and acrylic-elastomers; rubbery materials, for example, polyethylene, polypropylene, polybutadiene, polyisoprene, polychloroprene, polybutene, styrene-butadiene rubber and hydrogenation product thereof, acrylonitrile-butadiene rubber, ethylene-propylene copolymer, ethylene-propylene-ethylidene-norbornene copolymer; polyamide resins, for example nylon-6, -66, -610, -12, -11, -46, or the like; polyester resins, for example polyethylene terephthalate, polybutylene terephthalate, polyallylate and the like; homopolymers, or random, block or graft copolymers of, polystyrene, poly α-methylstyrene, polyvinyl acetate, polyvinyl chloride, polyacrylates, polymethacrylates, polyacrylonitrile, polyurethanes, polyacetals, polycarbonates, polyphenylene oxide, polysulfones, polyether sulfones, polyaryl sulfones, polyphenylene sulfide sulfones, polyether ketones, polyether ether ketones, polyphenylene sulfide ketone, polyimides, polyamide imides, silicone resins, phenoxy resins, epoxy resins, fluorine resins and melt-fabricable resins capable of forming anisotropic melt, phase; and mixtures thereof or modified products thereof.

In the present PAS composite material, the PAS and the organomodified layer-structure silicate mineral are strongly bound via ionic bonding or covalent bonding. Therefore, the heat resistance and rigidity properties of PAS are desirably improved without necessity of using a large amount of reinforcing filler additive. The composite material of the invention exhibits a significantly increased crystallizing rate and hence enables one to use a relatively low mold temperature and/or to reduce the period of time per molding cycle, and thus to facilitate the molding operation as well as to save the heat energy requirement.

DETAILED DESCRIPTION OF THE INVENTION

The invention will be illustrated in more detail with reference to the following non-limiting Examples.

The PPS materials and organomodified layer-structure minerals used in the Examples were prepared as follows:

Preparation 1

A reactor vessel having an internal volume of 530 liters and provided with a stirrer, a dehydrating column and a temperature controlling jacket was charged with 110 liters of N-methyl-2-pyrrolidone (referred to as NMP hereinafter) and 61.1 kg of sodium sulfide (a purity of 60.2% by weight as $Na_2S$) and heated by means of the jacket with stirring while dehydrating the mixture by the dehydrating column until the internal temperature reached about 200° C. By the thermal dehydration, 13.5 liters of a distillate comprising mainly of water was distilled off. Thereafter, 68.0 kg of p-dichlorobenzene and 48 liters of NMP were added to the mixture, which was heated up to 225° C. over a period of two hours, allowed to react at 225° C. for a further two hours and then heated to 250° C. over a period of 30 minutes. At the time when the temperature of 250° C. was attained, a solution of 760 g of 3,5-dichloroaniline dissolved in 10 liters of NMP was pumped into the reactor. The mixture was allowed to react at 250° C. for a further period of 3 hours.

Upon completion of the reaction, the reacted liquor was transferred into a solvent recovery vessel provided with a stirrer, a jacket and a vacuum line. Into the vessel, 30 liters of fresh NMP was also added. Then, the solvent recovery vessel containing the liquor mixture was heated under vacuum so as to obtain a distillate of 210 liters comprising mainly of NMP. Thereafter, 200 liters of water was added to the still residue in the vessel so as to form an aqueous slurry which was heated at 80° C. for 15 minutes with stirring. From the slurry, a product polymer was recovered by centrifugal separation.

The recovered crude polymer was returned to the solvent recovery vessel, to which 200 liters of water added. The mixture was heated at 180° C. for 30 minutes with stirring. After cooling, a powdery polymer was recovered from the mixture in a centrifugal separator. The above refining procedure was further repeated twice.

The resulting polymer, PPS, was transferred into a jacketed ribbon blender to dry the polymer.

A sample of the dried polymer was taken. Its melt viscosity was determined to be 610 poises as measured at 300° C. under a load of 10 kg in a KOHKA-type flow tester using an orifice of 0.5 mm diameter and 2 mm length.

The above prepared, amino group-containing PPS product will be referred to as "PPS-I" hereinafter.

Preparation 2

The general procedure of the preceding Preparation 1 was repeated except for omission of the 3,5-dichloroaniline. A product PPS having a melt viscosity of 870 poises was obtained.

The resulting PPS was immersed in a 2% aqueous hydrochloric acid solution and washed therein at room temperature with stirring for 2 hours. The mixture was subjected to solid-liquid separation, and the solid was repeatedly washed with water until the washing became neutral. The thus treated polymer was dried in a vacuum drier at 100° C. for one day. The resulting polymer had a melt viscosity of 810 poises. This PPS containing thiol end groups will be referred to as "PPS-II" hereinafter.

Preparation 3

The general procedure of Preparation 1 was repeated with omission of the 3,5-dichloroaniline used in Preparation 1. A product PPS having a melt viscosity of 870 poises was obtained. This PPS will be referred to as "PPS-III" hereinafter.

Part of the polymer was charged into a jacketed ribbon blender, which was heated to 265° C. while blowing air thereinto, so as to subject the polymer to curing treatment for a period of 15 hours. After curing, the polymer showed an increased melt viscosity of 20,000 poises. The thus cured PPS will be referred to as "PPS-IV" hereinafter.

Preparation 4

A commercially available acid clay (manufactured by Wako Pure Chemical Industries; 50 g) was dispersed in 2 liters of water and heated to 90° C. The heated slurry was slowly added to an aqueous solution (0.5 liters) containing 14 g of 12-aminododecanoic acid and 11.5 g of acetic acid. The mixture was stirred at 90°–95° C. for 10 minutes so as to ion-exchange the clay material. The resulting solid material was collected by filtration, thoroughly washed with water and then lyophilized to isolate the organomodified layer-structure silicate mineral. The thus prepared layer-structure silicate mineral contained carboxyl groups. The product will referred to as "MT-001".

Preparation 5

The procedure as described in Preparation 4 was repeated except that 15.9 g of N, N-dimethylaminoethyl acrylate methyl chloride quaternary salt (available from Kojin Co, Ltd.) was used in place of the 12-aminododecanoic acid and acetic acid used in Preparation 4. The thus prepared organomodified layer-structure silicate mineral contained vinyl groups. The product will be referred to as "MT-002".

Preparation 6

The procedure as described in Preparation 4 was repeated except that 14.4 g of lauryl amine hydrochloric acid salt was used in place of the 12-aminododecanoic acid and acetic acid used in Preparation 4. The thus resulting organomodified layer-structure silicate mineral will be referred to as "MT-003".

Preparation 7

The procedure as described in Preparation 4 was repeated to produce an organomodified layer-structure silicate mineral except that 20 g of a commercially available hectorite (Raponite RD; Nippon Silica) was used in place of the acid clay and that 4.2 g of N,N-dimethylaminoethyl acrylate methyl chloride quaternary salt was used in place of the 12-aminododecanoic acid and acetic acid. The resulting, organomodified layer-structure silicate mineral containing vinyl groups will be referred to as "RD-001" hereinafter.

Preparation 8

The procedure as described in Preparation 7 was repeated to prepare an organomodified layer-structure silicate mineral except that 4.4 g of N,N-dimethylamino propyl acrylamide methyl chloride quaternary salt (available from Kojin Co., Ltd.) was used in place of the N,N-dimethylamino ethyl acrylate methyl chloride quaternary salt. The resulting organomodified layer-structure silicate mineral containing vinyl groups will be referred to as "RD-002" herein-after.

Preparation 9

The procedure as described in Preparation 7 was repeated to prepare an organomodified layer-structure silicate mineral except that 6.9 g of 4,4'-diaminodiphenyl disulfide and 5.7 g of concentrated hydrochloric acid were used in place of the N,N-dimethylamino ethylacrylate methyl chloride quaternary salt. The thus prepared organomodified layer-structure silicate mineral containing disulfide groups will be referred to as "RD-003" hereinafter.

Preparation 10

The procedure as described in Preparation 9 was repeated to prepare an organomodified layer-structure silicate mineral except that a commercially available swelling mica (ME-100; Corp Chemical Co., Ltd) was used in place of the hectorite material. The thus resulting organomodified layer-structure silicate mineral containing disulfide groups will be referred to as "ME-001" hereinafter.

Preparation 11

The procedure as described in Preparation 7 was repeated to prepare an organomodified layer-structure silicate mineral except that 3.8 g of 2,2'-azobis(2-amidinopropane) di-hydrochloric acid salt was used in place of the N,N-dimethylamino ethylacrylate methyl chloride quaternary salt. The thus resulting organomodified layer-structure silicate mineral containing azo groups will be referred to as "RD-004" hereinafter.

Preparation 12

The procedure as described in Preparation 7 was repeated to prepare an organomodified layer-structure silicate mineral except that 2.8 g of NMP and 2.8 g of concentrated hydrochloric acid were use in place of the N, N-dimethylamino ethyl acrylate methyl chloride quaternary salt. The thus resulting NMP-modified layer-structure silicate mineral will be referred to as "RD-005" hereinafter.

Preparation 13

The procedure as described in Preparation 12 was repeated to prepare an organomodified layer-structure silicate mineral except that an acid clay was used in place of the hectorite material. The thus resulting NMP-modified layer-structure silicate mineral will be referred to as "MT-004" hereinafter.

Preparation 14

The procedure as described in Preparation 12 was repeated to prepare an organomodified layer-structure silicate mineral except that a swelling mica was used in place of the hectorite material. The thus resulting NMP-modified layer-structure silicate mineral will be referred to as "ME-002" hereinafter.

Preparation 15

A hectorite material (20 g) was dispersed in 300 ml of dimethyl sulfoxide (denoted as DMSO hereinafter) and stirred at room temperature for 72 hours. The solid content was separated from the liquid phase to give a hectorite swollen by DMSO. The swollen material was dispersed in 400 ml of dioxane, to which 24.5 g of 7-octenyl dimethyl chlorosilane (available from Chisso Co., Ltd) and 0.21 g of 3,5-di-t-butyl hydroquinone were added. The mixture was allowed to react under reflux for 24 hours so as to organomodify the mineral. After the reaction, the solid content was collected by filtration, washed with dioxane and lyophilized to isolate the organomodified layer-structure silicate mineral. The thus resulting organomodified layer-structure silicate mineral containing vinyl groups will be referred to as "RD-006" hereinafter.

Preparation 16

The procedure as described in Preparation 15 was repeated to give an organomodified layer-structure silicate mineral except that 25.3 g of 1,3-divinyl-1,1,3,3-tetramethyl disilazane(available from Shinetsu Chemical Industry Co., Ltd.) was used in place of the 7-octenyl dimethyl chlorosilane. The thus resulting organomodified layer-structure silicate mineral containing vinyl groups will be referred to as "RD-007" hereinafter.

EXAMPLES 1–9

As set forth in Table 1, PPS-I, PPS-III or PPS-IV (110 g) was mixed with an appropriate organomodified layer-structure silicate mineral and subjected to melt kneading at 300° C. for 10 minutes in LABOPLAS-TOMILL (manufactured by Toyo Seiki Co., Ltd.) to give a PPS/layer-structure silicate mineral composite. The resulting composite was injection molded into test specimens in a small injection molding machine (Panajection: manufactured by Matsushita Electric Industrial Co., Ltd.) using a cylinder temperature of 320° C. and a mold temperature of 140° C. The test specimens were used for determining the flexural strength, flexural modulus and heat distortion temperature in accordance with the appropriate test methods of ASTM. The state of the finely-divided layer-structure silicate mineral dispersed in the PPS matrix was inspected by means of an X-ray diffractometer (JDX-11PA; manufactured by Jeol Ltd.) The melt crystallization temperature of the composite was determined using a DSC (DSC 200: manufactured by Seiko Electronics), in which a sample was allowed to stand in the molten state for 5 minutes at 340° C. and then cooled at a rate of 10° C./min.

The results are set forth in Table 1, which are indicative of that, by virtue of the linkage of PPS and organomodified layer-structure silicate mineral via ionic bond, the melt crystallization temperature of PPS shifts higher and the composite material will exhibit an increased crystallizing rate as compared with the neat PPS.

EXAMPLES 10–12

A 2-liter capacity autoclave was charged with 220 g of PPS-III, an appropriate organomodified layer-structure silicate mineral as set forth in Table 1, and 680 g of NMP. The autoclave was purged with nitrogen and hermetically closed. Then the reaction system was heated to 230° C. and allowed to react at this temperature for one hours. After the reaction, the reaction system was cooled to room temperature. The cooled autoclave was opened and the content therof was withdrawn into a bulk of water to permit the solid content to precipitate. The resulting slurry was filtered to collect the solid material, which was then washed with warm water to remove any residual NMP. The recovered solid material was heated and dried under vacuum to give a product composite of PPS/layer-structure silicate mineral. The resulting composite was used for forming test specimens by injection molding and tested for the physical properties as in Examples 1–9.

The results are set forth in Table 1.

Again, the results are indicative of that, by virtue of the linkage of PPS and organomodified layer-structure silicate mineral via ionic bond, the melt crystallization temperature of PPS shifts higher and the composite material will exhibit an increased crystallizing rate as compared with the neat PPS.

COMPARATIVE EXAMPLES 1–3

Neat PPS-I, PPS-III and PPS-IV which respectively contained no organomodified layer-structure silicate minerals were tested for the physical properties as in the preceding Examples 1–12. However, in each of the cases, the melt crystallization temperature was found to be lower than those of the corresponding composites according to the invention. This is indicative that the crystallizing rate of the neat PPS is less than those of the corresponding composites according to the invention.

COMPARATIVE EXAMPLES 4–6

In each of the cases, a PPS was composited with an unmodified layer-structure silicate mineral by the procedure as described in Examples 1–9. The resulting composite was tested for the physical properties as in Examples 1–9. The results are set forth in Table 1. However, the melt crystallization temperature was found to be lower than those of the corresponding composites according to the invention. This is indicative that the crystallizing rate of the unmodified PPS composite is less than those of the corresponding modified composites according to the invention.

COMPARATIVE EXAMPLES 7 and 8

In these Examples, lauryl amine hydrochloric acid salt and 12-aminododecanoic acid acetate salt were used to prepare modified layer-structure silicate minerals. PPS-III form Preparation 3 which was free of additionally introduced functional groups was treated with either one of the above agents in the manner as described in the preceding Examples 10–12. Due to the absence of the functional groups reactive with the agents, the PPS and the agents did not chemically link to each other. The test results are set forth in Table 1. The melt crystallization temperatures observed in these Examples are significantly lower than those achieved in the Examples according to the invention. The low melt crystallization temperatures are indicative of correspondingly low crystallizing rates.

EXAMPLES 13–20

In these Examples, either PPS-I or PPS-II was employed.

A 2 liter-capacity autoclave was charged with 220 g of PPS, an organomodified layer-structure silicate mineral (see Table 2) and 680 g of NMP, and then purged with nitrogen, hermetically closed, and heated to 230° C. The mixture was allowed to react at this temperature for one hour. After the reaction, the reaction system was cooled to room temperature. The cooled autoclave was opened and the content thereof was withdrawn into a bulk of water to permit the solid content to precipitate. The resulting slurry was filtered to collect the solid material, which was then washed with warm water to remove any residual NMP. The recovered solid material was heated and dried under vacuum to give a product composite of PPS/layer-structure silicate mineral.

The resulting composite was used for forming test specimens by injection molding and tested for the physical properties as in Examples 1–9. The results are set forth in Table 2.

Figure 1:
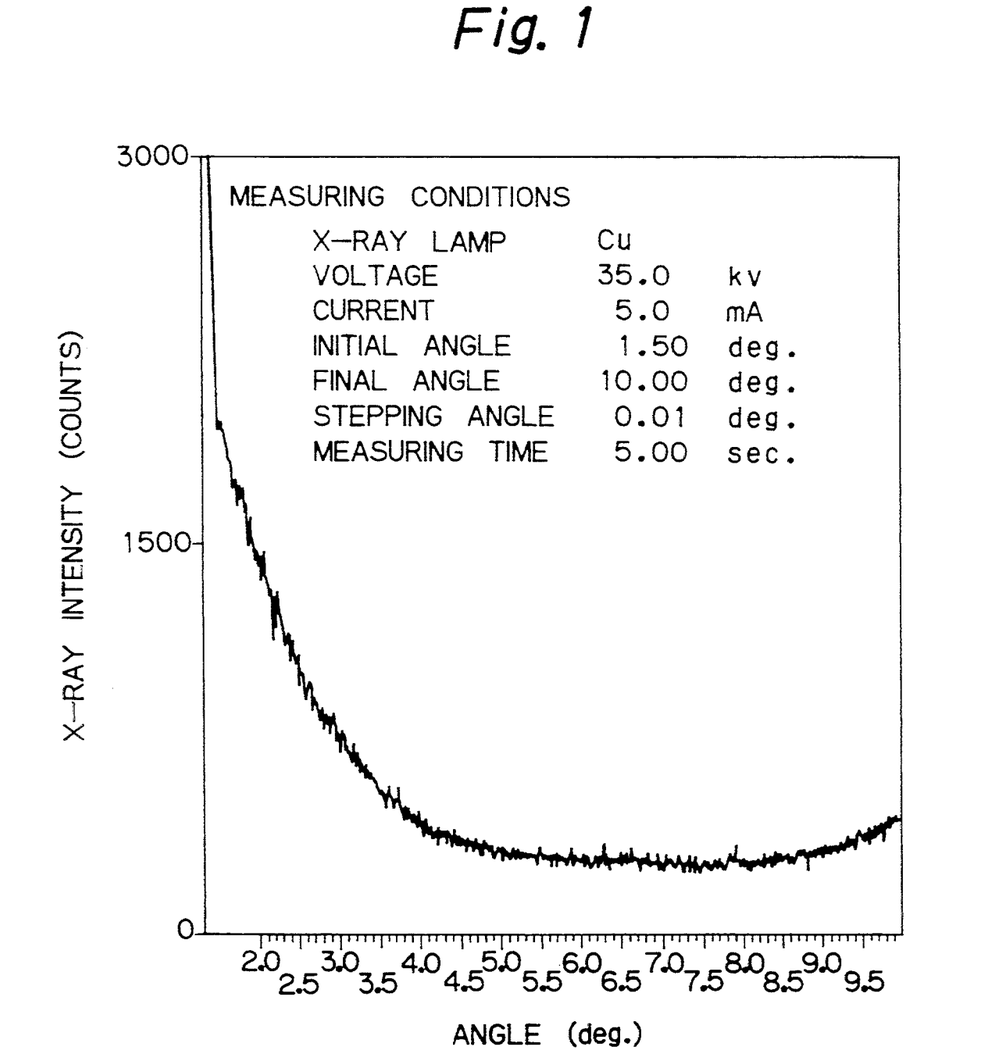
FIG. 1 is an X-ray diffraction pattern observed with the product composite of Example 13.

A sample of the product composite of Example 13 was subjected to X-ray diffractometry. An X-ray diffraction pattern as shown in FIG. 1 was obtained.

On examination of the diffraction pattern, there is not found any significant peak corresponding to or representing the interplanar spacings of the original layer-structure mineral. This is indicative that the layer of the silicate mineral are separated discreterly into individual layers or laminates containing a few layers and are evenly dispersed (possibly with a mean distance exceeding 100 Angstroms between the individuals) in the PPS matrix.

As shown in Table 2, the composite materials of these Examples are improved in the flexural strength, flexural modulus and hear distortion properties in comparison with the meat PPS materials. Thus, the products formed therefrom will exhibit excellent mechanical and heat resistance properties. It is also seen that the melt crystallization temperatures shift much higher in comparison with those of the neat PPS materials, suggesting a very enhanced increase in the crystallizing rates.

EXAMPLES 21 and 22

A 500 ml-capacity separable flask was charged with 350 g of ε-caprolactam and heated under a stream of nitrogen so as to melt the lactam. When an internal temperature of 100° C. was attained, an organomodified layer-structure silicate mineral was added (see Table 2), and the mixture was stirred at 100° C. for 2 hours to swell the layer-structure silicate mineral with the lactam solvent. Thereafter, 110 g of PPS-IV was added, and the mixture was raised to a temperature of 250° C. and allowed to react at this temperature for 2 hours. After the reaction, the reactor system was cooled to room temperature and then the reacted mixture was poured into 3 liters of water so as to cause precipitation to take place. The resulting slurry was filtered to collect the solid content, which was then washed with warm water to remove ε-caprolactam, and heated under vacuum to give a dried composite of PPS/layer-structure silicate mineral.

The thus resulting PPS/layer-structure silicate mineral composites of these Examples were formed into test specimens and tested as described in Examples 1–9. The results are set forth in Table 2. It is shown that these composites exhibit good dispersion of the silicate mineral layers and excellent mechanical and heat resistance properties as well as significantly increased crystallizing rates.

COMPARATIVE EXAMPLE 9

A neat PPS material (PPS-II) without being treated with any organomodified layer-structure silicate mineral was subjected to the tests as described in the preceding Examples. The results are set forth in Table 2.

The neat PPS material shows mechanical and heat resistance properties inferior to the composites according to the invention. The heat distortion temperature thereof is indicative of a low crystallizing rate.

COMPARATIVE EXAMPLE 10

Figure 2:
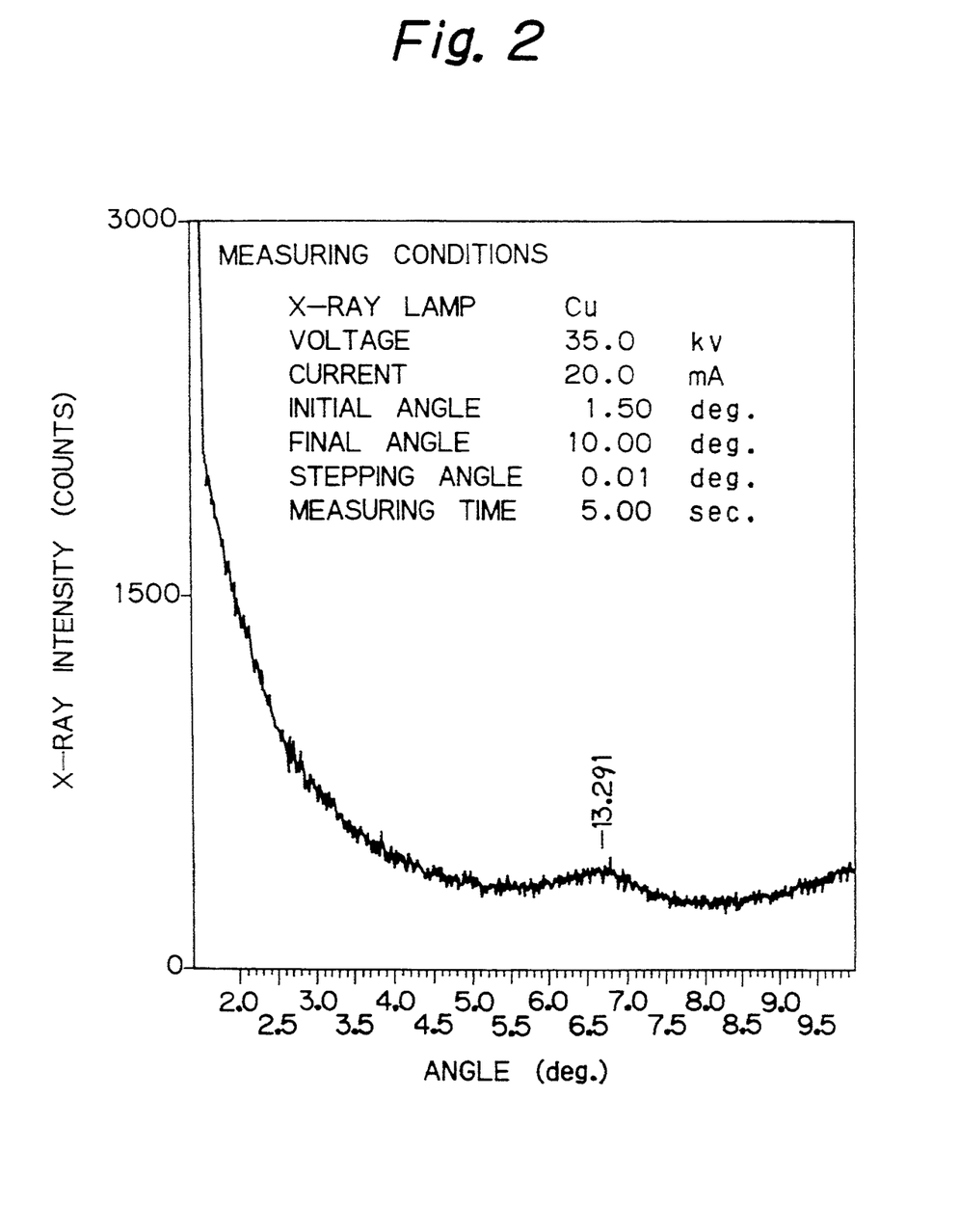
FIG. 2 is an X-ray diffraction pattern observed with the product of Comparative Example 10.

As an organizing reagent, lauryl amine hydrochloric acid salt carrying no functional groups reactive with PPS was employed to organomodify an acid clay mineral. The organomodified acid clay and PPS-II were combined together to give a composite by the procedure of comparative Example 7. The dispersion of the layers of silicate mineral in the resulting composite was inspected by means of X-ray diffractometry. It was found that a mean distance between the dispersed individual mineral laminates was found to be 13 Angstrom (see the X-ray diffraction pattern shown in FIG. 2). This was indicative of that even dispersion of mineral layers was not achieved.

The composite had mechanical and thermal properties inferior to the composites according to the invention.

As shown by this Example, where the PPS material and silicate material are not chemically combined, the composite prepared therefrom shows little or no improvements respect to the mechanical and thermal properties.

COMPARATIVE EXAMPLE 11

An organomodified acid clay containing carboxyl groups was combined with PPS-II containing no functional groups reactive with the carboxyl groups as to form a composite by the procedure as described in Comparative Example 8. X-ray diffraction of the composition exhibited that a good dispersion of silicate layers was achieved. However, the composite showed little improvements in the mechanical and thermal properties (see Table 2). Thus, the absence of the chemical linkage between the PPS and the silicate mineral layers appears to provide substantially no or little improvements in the mechanical and thermal properties.

TABLE 1-1

| | Organomodified layer-structure silicate minerals | | | | PPS | | |
|---|---|---|---|---|---|---|---|
| | Code | layer-structure silicate minerals | Organizing reagents | Amount (wt. part) | Code | Functional group Introduced | Amount (wt part) |
| Example 1 | MT-001 | acid clay | 12-aminododecanoic acid + acetic acid (Example 1) | 4.8 | PPS-I | amino | 95.2 |
| 2 | RD-003 | hectorite | 4,4'-diamino-diphenyldisulfide + HCl (Example 2) | 3.0 | PPS-IV | — | 97.0 |
| 3 | " | " | 4,4'-diamino-diphenyldisulfide + HCl (Example 2) | 5.0 | " | " | 95.0 |
| 4 | ME-001 | mica | 4,4'-diamino-diphenyldisulfide + HCl (Example 2) | 3.0 | " | " | 97.0 |
| 5 | " | " | 4,4'-diamino-diphenyldisulfide + HCl (Example 2) | 5.0 | " | " | 95.0 |
| 6 | " | " | 4,4'-diamino-diphenyldisulfide + HCl (Example 2) | 7.1 | " | " | 92.9 |
| 7 | RD-004 | hectorite | 2,2'-azobis(2-aminodinopropane) (Example 7) | 5.0 | " | " | 95.0 |
| 8 | " | " | 2,2'-azobis(2-aminodinopropane) (Example 7) | " | PPS-III | " | " |
| 9 | MT-004 | acid clay | NMP.hydrochloric acid salt (Example 9) | " | PPS-IV | " | " |
| 10 | RD-005 | hectorite | NMP.hydrochloric acid salt | " | PPS-III | " | " |

TABLE 1-1-continued

|  | Organomodified layer-structure silicate minerals | | | | PPS | | |
|---|---|---|---|---|---|---|---|
|  | Code | layer-structure silicate minerals | Organizing reagents | Amount (wt. part) | Code | Functional group Introduced | Amount (wt part) |
| 11 | ME-002 | mica | NMP.hydrochloric acid salt (Example 9) | " | " | " | " |
| 12 | MT-004 | acid clay | NMP.hydrochloric acid salt (Example 9) | " | " | " | " |
| Comp. Ex. 1 | — | — | — | 0 | PPS-I | amino | 100 |
| 2 | " | " | " | " | PPS-III | — | " |
| 3 | " | " | " | " | PPS-IV | " | " |
| 4 | " | hectorite | " | 5.0 | " | " | 95.0 |
| 5 | " | mica | " | " | " | " | " |
| 6 | " | acid clay | " | " | " | " | " |
| 7 | MT-003 | " | laurylamin hydrochloric acid salt (Comp. Ex. 7) | " | PPS-III | " | " |
| 8 | MT-001 | " | 12-aminododecanoic acid + acetic acid (Comp. Ex. 8) | " | " | " | " |

*Load = 18.6 kg

TABLE 1-2

|  | PPS Composites | | | | |
|---|---|---|---|---|---|
|  | Interplanar spacing or distance between discrete laminates (Angstrom units) | Flexural strength (kg/cm$^2$) | Flexural modulus (kg/cm$^2$) | Heat distortion temperature* (°C.) | Melt crystallization temperature (°C.) |
| Example 1 | 15 | 740 | 35000 | 115 | 237 |
| 2 | 14 | 1100 | 35000 | 115 | 232 |
| 3 | 14 | 820 | 36000 | 112 | 243 |
| 4 | 15 | 1160 | 37000 | 118 | 237 |
| 5 | 15 | 850 | 39000 | 121 | 245 |
| 6 | 15 | 810 | 41000 | 120 | 246 |
| 7 | 15 | 830 | 41000 | 117 | 237 |
| 8 | 15 | 700 | 39000 | 119 | 225 |
| 9 | 15 | 860 | 39000 | 118 | 235 |
| 10 | >100 | 1190 | 35000 | 113 | 232 |
| 11 | >100 | 1170 | 38000 | 119 | 243 |
| 12 | >100 | 1250 | 38000 | 117 | 235 |
| Comp. Ex. 1 | — | 710 | 34000 | 112 | 203 |
| 2 | — | 1080 | 35000 | 112 | 202 |
| 3 | — | 1340 | 34000 | 112 | 223 |
| 4 | 12 | 1190 | 34000 | 110 | 225 |
| 5 | 13 | 1380 | 36000 | 111 | 225 |
| 6 | 12 | 1280 | 34000 | 112 | 223 |
| 7 | 13 | 1050 | 35000 | 113 | 208 |
| 8 | >100 | 1100 | 36000 | 114 | 209 |

TABLE 2-1

|  | Organomodified layer-structure silicate minerals | | | | PPS | | |
|---|---|---|---|---|---|---|---|
|  | Code | layer-structure silicate minerals | Organizing reagents | Amount (wt. part) | Code | Functional group Introduced | Amount (wt part) |
| Example 13 | MT-001 | acid clay | 12-aminododecanoic acid + acetic acid (Example 13) | 4.8 | PPS-I | amino | 95.2 |
| 14 | " | " | 12-aminododecanoic acid + acetic acid (Example 13) | 9.1 | " | " | 90.9 |
| 15 | MT-002 | " | N,N-dimethylaminoethyl acrylate methyl chloride quarternary salt (Example 15) | 4.8 | PPS-II | thiol | 95.2 |
| 16 | " | " | N,N-dimethylaminoethyl acrylate | 9.1 | " | " | 90.9 |

TABLE 2-1-continued

| | Organomodified layer-structure silicate minerals | | | | PPS | | |
|---|---|---|---|---|---|---|---|
| | Code | layer-structure silicate minerals | Organizing reagents | Amount (wt. part) | Code | Functional group Introduced | Amount (wt. part) |
| 17 | RD-001 | hectorite | methyl chloride quarternary salt (Example 15) N,N-dimethylamino-ethyl acrylate methyl chloride quarternary salt (Example 15) | 4.8 | " | " | 95.2 |
| 18 | RD-002 | " | N,N-dimethylamino-propyl acrylamide methyl chloride quarternary salt (Example 18) | " | " | " | " |
| 19 | RD-006 | " | 7-octenyl dimethyl chlorosilane (Example 19) | " | " | " | " |
| 20 | RD-007 | " | 1,3-divinyl-1,1,3,3-tetramethyl disilazane (Example 20) | " | " | " | " |
| 21 | RD-003 | " | 4,4'-diaminodiphenyl disulfide + 2HCl (Example 21) | 5.0 | PPS-IV | — | 95.0 |
| 22 | ME-001 | mica | 4,4'-diaminodiphenyl disulfide + 2HCl (Example 21) | " | " | " | " |
| Comp. Ex. 9 | — | — | — | 0 | PPS-II | thiol | 100 |
| 10 | MT-003 | acid clay | laurylamine hidrochloric acid salt (Comp. Ex. 10) | 4.8 95.2 | " | " | 95.2 |
| 11 | MT-001 | " | 12-aminododecanoic acid + acetic acid (Comp. Ex. 11) | " | " | " | " |

*Load = 18.6 kg

TABLE 2-2

| | PPS Composites | | | | |
|---|---|---|---|---|---|
| | Interplaner spacing or distance between discrete laminates (Angstrom units) | Flexural strength (kg/cm$^2$) | Flexural modulus (kg/cm$^2$) | Heat distortion temperature* (°C.) | Melt crystallization temperature (°C.) |
| Example 13 | >100 | 850 | 40000 | 124 | 247 |
| 14 | >100 | 950 | 44000 | 126 | 250 |
| 15 | >100 | 820 | 39000 | 131 | 254 |
| 16 | >100 | 870 | 41000 | 143 | 257 |
| 17 | >100 | 890 | 41000 | 138 | 256 |
| 18 | >100 | 860 | 39000 | 131 | 253 |
| 19 | >100 | 870 | 40000 | 125 | 249 |
| 20 | >100 | 880 | 39000 | 128 | 251 |
| 21 | >100 | 870 | 41000 | 148 | 251 |
| 22 | >100 | 770 | 44000 | 136 | 256 |
| Comp. Ex. 9 | — | 720 | 34000 | 112 | 224 |
| 10 | 13 | 760 | 35000 | 113 | 228 |
| 11 | >100 | 780 | 36000 | 114 | 229 |

What is claimed is:

1. A polyarylene sulfide composite material which is prepared by a process comprising at least two steps:

(A) treating layer-structure silicate material with an aqueous solution of an organic onium salt or a solution of an organic silazane or halogenated organosilane dissolved in an organic solvent in which the layer-structure silicate is swellable, so as to form an organomodified layer-structure complex; and (B) reacting the thus formed organomodified layer-structure complex with a polyarylene sulfide in a polar organic solvent in which the polyarylene sulfide is soluble and the organomodified layer-structure complex is dispersed evenly such that layers of silicate mineral are separated discretely into individual layers or laminates containing a few layers with a mean distance of at least 30 Å between the centers of gravity of individual single layers and at least 50% of the silicate mineral is dispersed without forming masses consisting of large numbers of silicate mineral layers, so as to provide a polyarylene sulfide composite material, said polyarylene sulfide composite material comprising 100 parts by weight of the polyarylene sulfide and from about 0.1 to about 150 parts by weight of said organomodified layer-structure silicate complex, said polyarylene sulfide and said organomodified layer-structure silicate complex being linked through either ionic or covalent bonding.

2. A composite material as claimed in claim 1 wherein the polyarylene sulfide has a weight average molecular weight of about 10,000 to about 500,000.

3. A composite material as claimed in claim 1 wherein the polyarylene sulfide has functional groups reactive with the organomodified silicate material.

4. A composite material as claimed in claim 2 wherein the polyarylene sulfide has functional groups reactive with the organomodified silicate material.

5. A composite material as claimed in claim 1 wherein the silicate mineral is a layer-structure phyllosilicate.

6. A composite material as claimed in claim 2 wherein the silicate mineral is a layer-structure phyllosilicate.

7. A composite material as claimed in claim 3 wherein the silicate mineral is a layer-structure phyllosilicate.

8. A composite material as claimed in claim 4 wherein the silicate mineral is a layer-structure phyllosilicate.

9. A composite material as claimed in claim 1 wherein the organic onium salt has the general formula (A)—R—(B)[x]   or (A)—R—(C)—R'—(A)   or (A)—(B)—R
      |______| where R and R', which may be the same or different, each represent a divalent organic group containing 2–24 carbon atoms; A is an onium salt, B is a halogen or a carboxyl, nitro, vinyl, epoxy or thiol group; and C is a disulfide or azo group.

10. A composite material as claimed in claim 2 wherein the organic onium salt has the general formula (A)—R—(B)[x]   or (A)—R—(C)—R'—(A)   or (A)—(B)—R
      |______| where R and R', which may be the same or different, each represent a divalent organic group containing 2–24 carbon atoms; A is an onium salt, B is a halogen or a carboxyl, nitro, vinyl, epoxy or thiol group; and C is a disulfide or azo group.

11. A composite material as claimed in claim 3 wherein the organic onium salt has the general formula (A)—R—(B)[x]   or (A)—R—(C)—R'—(A)   or (A)—(B)—R
      |______| where R and R', which may be the same or different, each represent a divalent organic group containing 2–24 carbon atoms; A is an onium salt, B is a halogen or a carboxyl, nitro, vinyl, epoxy or thiol group; and C is a disulfide or azo group.

12. A composite material as claimed in claim 4 wherein the organic onium salt has the general formula (A)—R—(B)[x]   or (A)—R—(C)—R'—(A)   or (A)—(B)—R
      |______| where R and R', which may be the same or different, each represent a divalent organic group containing 2–24 carbon atoms; A is an onium salt, B is a halogen or a carboxyl, nitro, vinyl, epoxy or thiol group; and C is a disulfide or azo group.

13. A composite material as claimed in claim 5 wherein the organic onium salt has the general formula (A)—R—(B)[x]   or (A)—R—(C)—R'—(A)   or (A)—(B)—R
      |______| where R and R', which may be the same or different, each represent a divalent organic group containing 2–24 carbon atoms; A is an onium salt, B is a halogen or a carboxyl, nitro, vinyl, epoxy or thiol group; and C is a disulfide or azo group.

14. A composite material as claimed in claim 6 wherein the organic onium salt has the general formula (A)—R—(B)[x]   or (A)—R—(C)—R'—(A)   or (A)—(B)—R
      |______| where R and R', which may be the same or different, each represent a divalent organic group containing 2–24 carbon atoms; A is an onium salt, B is a halogen or a carboxyl, nitro, vinyl, epoxy or thiol group; and C is a disulfide or azo group.

15. A composite material as claimed in claim 7 wherein the organic onium salt has the general formula (A)—R—(B)[x]   or

(A)—R—(C)—R'—(A)   or (A)—(B)—R
      |______| where R and R', which may be the same or different, each represent a divalent organic group containing 2–24 carbon atoms; A is an onium salt, B is a halogen or a carboxyl, nitro, vinyl, epoxy or thiol group; and C is a disulfide or azo group.

16. A composite material as claimed in claim 8 wherein the organic onium salt has the general formula (A)—R—(B)[x]   or (A)—R—(C)—R'—(A)   or (A)—(B)—R where R and R', which may be the same or different, each represent a divalent organic group containing 2-24 carbon atoms; A is an onium salt, B is a halogen or a carboxyl, nitro, vinyl, epoxy or thiol group; and C is a disulfide or azo group.

17. A composite material as claimed in claim 1 wherein the halogenated organosilane or organic silazane has the general formula:

$$Y-R^1-SiR_2^2-X$$   or $$Y-R^1-SiR_2^2-NH-Sir_2^2-R^1-Y$$

wherein $R^1$ is a $C_0-C_{24}$ organic group; $R^2$ is a $C_1-C_{24}$ organic group; Y is a carboxyl, nitro, vinyl, epoxy or thiol group or a halogen; and X is a halogen.

18. A composite material as claimed in claim 2 wherein the halogenated organosilane or organic silazane has the general formula:

$$Y-R^1-SiR_2^2-S$$   or $$Y-R^1-SiR_2^2-NH-SiR_2^2-R^1-Y$$

wherein $R^1$ is a $C_0-C_{24}$ organic group; $R^2$ is a $C_1-C_{24}$ organic group; Y is a carboxyl, nitro, vinyl, epoxy or thiol group or a halogen; and X is a halogen.

19. A composite-material as claimed in claim 3 wherein the halogenated organosilane or organic silazane has the general formula:

$$Y-R^1-SiR_2^2-X$$   or $$Y-R^1-SiR_2^2-NH-SiR_2^2-R^1-Y$$

wherein $R^1$ is a $C_0-C_{24}$ organic group; $R^2$ is a $C_1-C_{24}$ organic group; Y is a carboxyl, nitro, vinyl, epoxy or thiol group or a halogen; and X is a halogen.

20. A composite material as claimed in claim 4 wherein the halogenated organosilane or organic silazane has the general formula:

$$Y-R^1-SiR_2^2-X$$   or $$Y-R^1-SiR_2^2-NH-SiR_2^2-R^1-Y$$

wherein $R^1$ is a $C_0-C_{24}$ organic group; $R^2$ is a $C_1-C_{24}$ organic group; Y is a carboxyl, nitro, vinyl, epoxy or thiol group or a halogen; and X is a halogen.

21. A composite material as claimed in claim 5 wherein the halogenated organosilane or organic silazane has the general formula:

$$Y-R^1-SiR_2^2-X$$   or $$Y-R^1-SiR_2^2-NH-SiR_2^2-R^1-Y$$

wherein $R^1$ is a $C_0-C_{24}$ organic group; $R^2$ is a $C_1-C_{24}$ organic group; Y is a carboxyl, nitro, vinyl, epoxy or thiol group or a halogen; and X is a halogen.

22. A composite material as claimed in claim 6 wherein the halogenated organosilane or organic silazane has the general formula:

$$Y-R^1-SiR_2^2-X$$

or $$Y-R^1-SiR_2^2-NH-SiR_2^2-R^1-Y$$

wherein $R^1$ is a $C_0-C_{24}$ organic group; $R^2$ is a $C_1-C_{24}$ organic group; Y is a carboxyl, nitro, vinyl, epoxy or thiol group or a halogen; and X is a halogen.

23. A composite material as claimed in claim 7 wherein the halogenated organosilane or organic silazane has the general formula:

$$Y-R^1-SiR_2^2-X$$

or $$Y-R^1-SiR_2^2-NH-SiR_2^2-R^1-Y$$

wherein $R^1$ is a $C_0-C_{24}$ organic group; $R^2$ is a $C_1-C_{24}$ organic group; Y is a carboxyl, nitro, vinyl, epoxy or thiol group or a halogen; and X is a halogen.

24. A composite material as claimed in claim 8 wherein the halogenated organosilane or organic silazane has the general formula:

$$Y-R^1-SiR_2^2-X$$   or $$Y-R^1-SiR_2^2-NH-SiR_2^2-R^1-Y$$

wherein $R^1$ is a $C_0-C_{24}$ organic group; $R^2$ is a $C_1-C_{24}$ organic group; Y is a carboxyl, nitro, vinyl, epoxy or thiol group or a halogen; and X is a halogen.

* * * * *